(12) United States Patent
Zhao et al.

(10) Patent No.: US 12,009,931 B2
(45) Date of Patent: Jun. 11, 2024

(54) UPLINK TRANSMISSION METHOD AND COMMUNICATIONS APPARATUS

(71) Applicant: Huawei Technologies Co., Ltd., Shenzhen (CN)

(72) Inventors: Li Zhao, Shanghai (CN); Qinghai Zeng, Shanghai (CN); Mingzeng Dai, Shenzhen (CN); Chunhua You, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 17/400,477

(22) Filed: Aug. 12, 2021

(65) Prior Publication Data

US 2021/0391959 A1 Dec. 16, 2021

Related U.S. Application Data

(63) Continuation of application No. PCT/CN2020/075153, filed on Feb. 13, 2020.

(30) Foreign Application Priority Data

Feb. 14, 2019 (CN) .......................... 201910115218.4

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01); *H04W 72/1268* (2013.01); *H04W 72/23* (2023.01)

(58) Field of Classification Search
CPC ............... H04L 1/1819; H04L 4/1896; H04W 72/0446; H04W 72/1268; H04W 72/23
See application file for complete search history.

(56) References Cited

U.S. PATENT DOCUMENTS

| 10,779,322 B2 | 9/2020 | Suzuki et al. |
| 11,096,244 B2 | 8/2021 | Phuyal et al. |

(Continued)

FOREIGN PATENT DOCUMENTS

| CN | 106559188 A | 4/2017 |
| CN | 107027180 A | 8/2017 |

(Continued)

OTHER PUBLICATIONS

US 11,102,812 B2, 08/2021, Kim et al. (withdrawn)
(Continued)

*Primary Examiner* — Brian P Cox
(74) *Attorney, Agent, or Firm* — SLATER MATSIL, LLP

(57) ABSTRACT

An uplink transmission method and a communications apparatus, the method including when transmitting, in a subframe in which an autonomous uplink transmission resource is configured, uplink data by using a first hybrid automatic repeat request (HARQ) process, considering that a new data indicator (NDI) for the first HARQ process is toggled, where the first HARQ process is a HARQ process that can be used for autonomous uplink transmission, and before the subframe, there is no uplink grant for the first HARQ process delivered to a HARQ entity, and performing new uplink data transmission in the subframe by using the first HARQ process.

17 Claims, 6 Drawing Sheets

(51) Int. Cl.
*H04W 72/0446* (2023.01)
*H04W 72/1268* (2023.01)
*H04W 72/23* (2023.01)

(56) References Cited

U.S. PATENT DOCUMENTS

| | | |
|---|---|---|
| 11,533,741 B2 | 12/2022 | Wu et al. |
| 2017/0223673 A1 | 8/2017 | Dinan et al. |
| 2017/0273074 A1 | 9/2017 | Park et al. |
| 2017/0366303 A1 | 12/2017 | Kim et al. |
| 2019/0150184 A1* | 5/2019 | Golitschek Edler von Elbwart ... H04L 1/1887 370/329 |
| 2019/0246391 A1* | 8/2019 | Zhang .................. H04L 1/1812 |

FOREIGN PATENT DOCUMENTS

| | | |
|---|---|---|
| CN | 108289331 A | 7/2018 |
| CN | 109075909 A | 12/2018 |
| WO | 2017180179 A1 | 10/2017 |
| WO | 2017196400 A1 | 11/2017 |
| WO | 2018003913 A1 | 1/2018 |
| WO | 2019027297 A1 | 2/2019 |

OTHER PUBLICATIONS

LTE; Evolved Universal Terrestrial Radio Access (E-UTRA); Radio Resource Control (RRC); Protocol specification (3GPP TS 36.331 verson 15.3.0 Release 15), ETSI TS 136.331 v15.3.0 (Oct. 2018) (Year: 2018).*

"Remaining HARQ Aspects for Autonomous Uplink," Agenda Item: 9.12.2, Source: Motorola Mobility, Lenovo, Document for: Discussion and Decision, 3GPP TSG RAN WG2 Meeting 102, R2-1808151, May 21-25, 2018, 3 pages.

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.4.0, Dec. 2018, 131 pages.

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.3.0, Sep. 2018, 918 pages.

"HARQ for Autonomous Uplink Access," Agenda item:6.2.2.3.2, Source: Qualcomm Incorporated, Document for: Discussion and Decision, 3GPP TSG RAN WG1 #90bis, R1-1718123, Revision of R1-1713027, Oct. 9-13, 2017, Prague, Czech, 3 pages.

"Miscellaneous Correction to FeLAA in TS 36.321," Source to WG: Huawei, HiSilicon, Source to TSG: R2, Work item code: LTE_unlic-Core, Date: Aug. 20, 2018, Category: F, Release: Rel-15, 3GPP TSG-RAN WG2 Meeting #103, R2-1812654, Gothenburg, Sweden, Aug. 20-24, 2018, 19 pages.

"Correction on NDI Toggling in FeLAA," Source to WG: Huawei, HiSilicon, Source to TSG: R2, Work item code: TE_unlic-Core, Date: Feb. 25, 2019, Category: F, Release: Rel-15, 3GPP TSG-RAN WG2 Meeting #105, Change Request, R2-1901220, Athens, Greece, Feb. 25-Mar. 1, 2019, 6 pages.

"Enhancements on Configured Grant for NR-U," Agenda Item: 7.2.2.4.4, Source: Samsung, Document for: Discussion and Decision, 3GPP TSG RAN WG1 Meeting #94, R1-1808771, Gothennburg, Sweden, Aug. 20-24, 2018, 6 bages.

* cited by examiner

| 1 | 0 | 0 | 1 | 1 | 1 | 1 | 1 | 0 | 0 |
| √ | × | × | √ | √ | √ | √ | √ | × | × |
| 0 | 1 | 2 | 3 | 4 | 5 | 6 | 7 | 8 | 9 |

←———————— SFN=0 ————————→

√ indicates that an AUL resource is configured in a subframe

× indicates that no AUL resource is configured in a subframe

UPLINK TRANSMISSION METHOD AND COMMUNICATIONS APPARATUS

CROSS-REFERENCE TO RELATED APPLICATIONS

This application is a continuation of International Patent Application No. PCT/CN2020/075153, filed on Feb. 13, 2020, which claims priority to Chinese Patent Application No. 201910115218.4, filed on Feb. 14, 2019. The disclosures of the aforementioned applications are hereby incorporated by reference in their entireties.

TECHNICAL FIELD

Embodiments of this application relate to the communications field, and in particular, to an uplink transmission method and a communications apparatus.

BACKGROUND

To improve data sending efficiency, autonomous uplink (AUL) transmission is supported in a long term evolution (LTE) system. A terminal may directly send uplink data on an AUL resource without scheduling the uplink data by a base station. The base station may configure, for the terminal, some subframes used for AUL and hybrid automatic repeat request (HARQ) processes used for AUL.

The terminal may randomly select, from the HARQ processes preconfigured by the base station, one HARQ process to perform uplink transmission in a subframe in which an AUL resource is configured in a serving cell. However, the HARQ process selected by the terminal may fail to enter new transmission, which affects transmission performance of a communications system.

SUMMARY

Embodiments of this application provide an uplink transmission method and a communications apparatus, so as to ensure that a terminal normally enters new transmission.

To achieve the foregoing objective, the following technical solutions are used in the embodiments of this application.

According to a first aspect, an uplink transmission method is disclosed, and includes when transmitting, in a subframe in which an autonomous uplink transmission resource is configured, uplink data by using a first HARQ process, a terminal considers that a new data indicator (NDI) of the first HARQ process is toggled, where the first HARQ process is a HARQ process that can be used for autonomous uplink transmission, and before the subframe, there is no uplink grant for the first HARQ process delivered to a HARQ entity. The terminal may further perform new uplink data transmission in the subframe by using the first HARQ process.

In the uplink transmission method provided in this embodiment of this application, when the terminal sends, in the subframe in which the AUL resource is configured in a serving cell, data by using the first HARQ process, if the first HARQ process is not used for transmission before the subframe, the terminal considers that the NDI for the first HARQ process is toggled. Further, the terminal may enter new transmission in the subframe, and perform uplink data transmission by using the first HARQ process. The method provided in this embodiment of this application solves a problem that some preconfigured HARQ processes that can be used for autonomous uplink transmission cannot enter a new transmission procedure during initial transmission and uplink transmission cannot be performed by using the autonomous uplink transmission resource. This method avoids a resource waste caused by the problem.

With reference to the first aspect, in a first possible implementation of the first aspect, before the transmitting uplink data by using a first HARQ process, the method further includes receiving an autonomous uplink transmission activation message, where the autonomous uplink transmission activation message is used to activate the autonomous uplink transmission resource, and toggling an NDI for a second HARQ process, where the second HARQ process is different from the first HARQ process.

In this embodiment of this application, the terminal may toggle an NDI for a HARQ process after receiving the autonomous uplink transmission activation message, and the terminal can enter new transmission in a first subframe by using the HARQ process. If a HARQ process selected by the terminal for the first subframe is not the HARQ process, the terminal may consider that an NDI for the selected HARQ process is toggled, and may also enter new transmission.

With reference to the first aspect or the first possible implementation of the first aspect, in a second possible implementation of the first aspect, the considering that an NDI for the first HARQ process is toggled includes setting a HARQ feedback value of the first HARQ process to an acknowledgement, and considering, based on the acknowledgement, that the NDI for the first HARQ process is toggled.

In this embodiment of this application, after the terminal selects the first HARQ process for a subframe in which the autonomous uplink transmission resource is configured, if the first HARQ process is not used for transmission before the subframe, the terminal may set the HARQ feedback value of the first HARQ process to the acknowledgement. According to an existing protocol, an NDI for a HARQ process whose HARQ feedback value is set to an acknowledgement is considered to be toggled. Therefore, the terminal may consider that the NDI for the first HARQ process is toggled, and may enter new transmission.

According to a second aspect, an uplink transmission method is disclosed, and includes, at a first moment, a terminal considers that an NDI for a hybrid automatic repeat request HARQ process that meets a first condition is toggled, where the first moment is a moment at which an autonomous uplink transmission configuration message is received or a moment at which an autonomous uplink transmission activation message is received, and the first condition is that the HARQ process is a HARQ process that can be used for autonomous uplink transmission. The terminal may further perform, in a subframe in which an autonomous uplink transmission resource is configured, new uplink data transmission by using the HARQ process that meets the first condition.

In the uplink transmission method provided in this embodiment of this application, when receiving the autonomous uplink transmission configuration message or receiving the autonomous uplink transmission activation message, the terminal considers that the NDI for the HARQ process that meets the first condition is toggled. Further, the terminal may select, in a subframe in which the autonomous uplink transmission resource is configured, one HARQ process that meets the first condition to perform new uplink data transmission. The method provided in this embodiment of this application solves a problem that some preconfigured HARQ processes that can be used for autonomous uplink transmission cannot enter a new transmission procedure during initial transmission and uplink transmission cannot be performed by using the autonomous uplink transmission resource. This method avoids a resource waste caused by the problem.

With reference to the second aspect, in a first possible implementation of the second aspect, if the first moment is the moment at which the autonomous uplink transmission configuration message is received, the first condition further includes when the autonomous uplink transmission configuration message is received, there is no uplink grant for the first HARQ process delivered to a HARQ entity, and/or before the autonomous uplink transmission configuration message is received, there is no uplink grant for the first HARQ process delivered to a HARQ entity.

In the uplink transmission method provided in this embodiment of this application, when receiving the autonomous uplink transmission configuration message, the terminal considers that an NDI for a HARQ process that is not used when the terminal receives the autonomous uplink transmission configuration message is toggled. In this way, the terminal may perform, in a subframe in which the autonomous uplink transmission resource is configured, new uplink data transmission by using the HARQ process that is not used when the terminal receives the autonomous uplink transmission configuration message. Alternatively, when receiving the autonomous uplink transmission configuration message, the terminal considers that an NDI for a HARQ process that is not used before the terminal receives the autonomous uplink transmission configuration message is toggled. In this way, the terminal may perform, in a subframe in which the autonomous uplink transmission resource is configured, new uplink data transmission by using the HARQ process that is not used before the terminal receives the autonomous uplink transmission configuration message.

With reference to the second aspect, in a second possible implementation of the second aspect, if the first moment is the moment at which the autonomous uplink transmission activation message is received, the first condition further includes when the autonomous uplink transmission activation message is received, there is no uplink grant for the HARQ process delivered to a HARQ entity, and/or before the autonomous uplink transmission activation message is received, there is no uplink grant for the HARQ process delivered to a HARQ entity.

In the uplink transmission method provided in this embodiment of this application, when receiving the autonomous uplink transmission activation message, the terminal considers that an NDI for a HARQ process that is not used when the terminal receives the autonomous uplink transmission activation message is toggled. In this way, the terminal may perform, in a subframe in which the autonomous uplink transmission resource is configured, new uplink data transmission by using the HARQ process that is not used when the terminal receives the autonomous uplink transmission activation message. Alternatively, when receiving the autonomous uplink transmission activation message, the terminal considers that an NDI for a HARQ process that is not used before the terminal receives the autonomous uplink transmission activation message is toggled. In this way, the terminal may perform, in a subframe in which the autonomous uplink transmission resource is configured, new uplink data transmission by using the HARQ process that is not used before the terminal receives the autonomous uplink transmission activation message.

With reference to the second aspect or the first or second possible implementation of the second aspect, in a third possible implementation of the second aspect, the considering that the NDI for the HARQ process that meets the first condition is toggled includes at the first moment, setting a HARQ feedback value of the HARQ process that meets the first condition to an acknowledgement, and considering, based on the acknowledgement, that the NDI for the HARQ process that meets the first condition is toggled.

In this embodiment of this application, if a HARQ process meets the first condition, the terminal may set a HARQ feedback value of the HARQ process to an acknowledgement. According to an existing protocol, an NDI for a HARQ process whose HARQ feedback value is set to an acknowledgement is considered to be toggled. Therefore, the terminal may consider that the NDI for the HARQ process is toggled, so that the terminal may enter, in a subframe in which the autonomous uplink transmission resource is configured, new uplink data transmission by using the HARQ process that meets the first condition.

According to a third aspect, a terminal is disclosed, and includes a processing unit, configured to when transmitting, in a subframe in which an autonomous uplink transmission resource is configured, uplink data by using a first hybrid automatic repeat request HARQ process, consider that a new data indicator NDI for the first HARQ process is toggled, where the first HARQ process is a HARQ process that can be used for autonomous uplink transmission, and before the subframe, there is no uplink grant for the first HARQ process delivered to a HARQ entity, and a communications unit, configured to perform new uplink data transmission in the subframe by using the first HARQ process.

With reference to the third aspect, in a first possible implementation of the third aspect, the communications unit is further configured to before transmitting the uplink data by using the first HARQ process, receive an autonomous uplink transmission activation message, where the autonomous uplink transmission activation message is used to activate the autonomous uplink transmission resource, and the processing unit is further configured to toggle an NDI for a second HARQ process, where the second HARQ process is different from the first HARQ process.

With reference to the third aspect or the first possible implementation of the third aspect, in a second possible implementation of the third aspect, the processing unit is specifically configured to set a HARQ feedback value of the first HARQ process to an acknowledgement, and consider, based on the acknowledgement, that the NDI for the first HARQ process is toggled.

According to a fourth aspect, a terminal is disclosed, and includes a processing unit, configured to at a first moment, consider that a new data indicator NDI for a hybrid automatic repeat request HARQ process that meets a first condition is toggled, where the first moment is a moment at which an autonomous uplink transmission configuration message is received or a moment at which an autonomous uplink transmission activation message is received, and the first condition is that the HARQ process is a HARQ process that can be used for autonomous uplink transmission, and a communications unit, configured to perform, in a subframe in which an autonomous uplink transmission resource is configured, new uplink data transmission by using the HARQ process that meets the first condition.

With reference to the fourth aspect, in a first possible implementation of the fourth aspect, if the first moment is the moment at which the autonomous uplink transmission configuration message is received, the first condition further includes when the autonomous uplink transmission configuration message is received, there is no uplink grant for the HARQ process delivered to a HARQ entity, and/or before the autonomous uplink transmission configuration message is received, there is no uplink grant for the HARQ process delivered to a HARQ entity.

With reference to the fourth aspect, in a second possible implementation of the fourth aspect, if the first moment is the moment at which the autonomous uplink transmission activation message is received, the first condition further includes when the autonomous uplink transmission activation message is received, there is no uplink grant for the HARQ process delivered to a HARQ entity, and/or before the autonomous uplink transmission activation message is received, there is no uplink grant for the HARQ process delivered to a HARQ entity.

With reference to the fourth aspect or the first or second possible implementation of the fourth aspect, in a third possible implementation of the fourth aspect, the processing unit is specifically configured to at the first moment, set a HARQ feedback value of the HARQ process that meets the first condition to an acknowledgement, and consider, based on the acknowledgement, that the NDI for the HARQ process that meets the first condition is toggled.

According to a fifth aspect, a communications apparatus is provided, where the communications apparatus includes a processor, and the processor is configured to be coupled to a memory, and read and execute instructions in the memory, to implement the uplink transmission method according to any one of the first aspect and the possible implementations of the first aspect.

Optionally, the communications apparatus may further include the memory, and the memory is configured to store program instructions and data of the communications apparatus. Further, optionally, the communications apparatus may include a transceiver, where the transceiver is configured to under control of the processor of the communications apparatus, perform the uplink transmission method according to any one of the first aspect and the possible implementations of the first aspect or the step of sending and receiving data in the uplink transmission method according to any two of the second aspect and the possible implementations of the second aspect, for example, perform, in a subframe in which an autonomous uplink transmission resource is configured, new uplink data transmission by using a first HARQ process, or perform, in a subframe in which an autonomous uplink transmission resource is configured, new uplink data transmission by using a HARQ process that meets a first condition.

Optionally, the communications apparatus may be a terminal, or may be a part of apparatuses in the terminal, for example, a chip or a chip system in the terminal. The chip or the chip system is configured to support the terminal in implementing the function in any one of the first aspect and the possible implementations of the first aspect, for example, receiving, sending, or processing data and/or information in the foregoing uplink transmission method. The chip system includes a chip, and may also include another discrete component or circuit structure.

According to a sixth aspect, a computer-readable storage medium is disclosed, where the computer-readable storage medium stores instructions, and the instructions are used to perform the uplink transmission method according to any one of the first aspect and the possible implementations of the first aspect, or the uplink transmission method according to any one of the second aspect and the possible implementations of the second aspect.

According to a seventh aspect, a computer program product including instructions is further provided, where when the computer program product runs on a communications apparatus, the communications apparatus is enabled to perform the uplink transmission method according to the first aspect and the possible implementations of the first aspect or the uplink transmission method according to the second aspect and the possible implementations of the second aspect.

According to an eighth aspect, a wireless communications apparatus is disclosed, where the wireless communications apparatus includes instructions, and when the wireless communications apparatus runs on the terminal according to any one of the third aspect, the implementations of the third aspect, the fourth aspect and the implementations of the fourth aspect, the terminal is enabled to perform the uplink transmission method according to any one of the first aspect and the possible implementations of the first aspect, or the uplink transmission method according to any one of the second aspect and the possible implementations of the second aspect. The wireless communications apparatus may be a chip.

According to a ninth aspect, a communications system is disclosed, and includes a base station and the terminal according to any possible implementation of the third aspect, includes a base station and the terminal according to any aspect of the fourth aspect, includes a base station and the communications apparatus according to any aspect of the fifth aspect, or includes a base station and the wireless communications apparatus according to any aspect of the eighth aspect.

DETAILED DESCRIPTION OF ILLUSTRATIVE EMBODIMENTS

The following describes technical solutions in this application with reference to the accompanying drawings.

Figure 1:
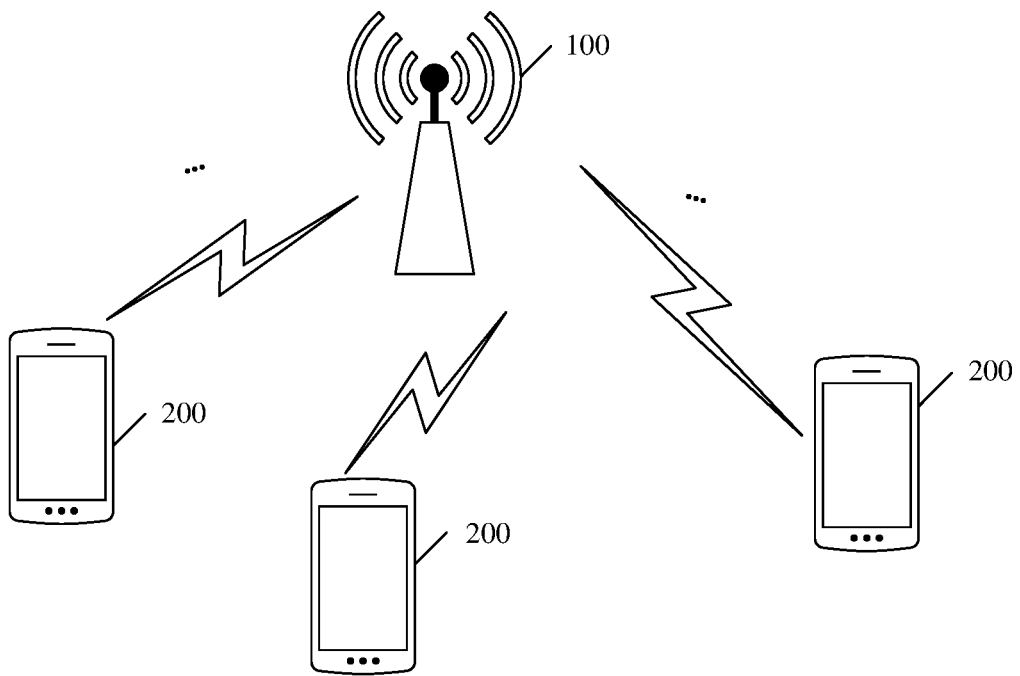
FIG. 1 is an architectural diagram of a communications system according to an embodiment of this application.

FIG. 1 is a schematic diagram of a communications system to which a technical solution provided in this application is applicable. The communications system may include one or more network devices 100 (only one network device is shown) and one or more terminals 200 connected to each network device 100. FIG. 1 is merely a schematic diagram, and does not constitute a limitation on an applicable scenario of the technical solutions provided in this application.

The network device 100 may be a transmission reception point (transmission reception point, TRP), a base station, a relay station, an access point, or the like. The network device 100 may be a network device in a 5G communications system or a network device in a future evolved network, or may be a wearable device, a vehicle-mounted device, or the like. In addition, the network device 100 may alternatively be a base transceiver station (BTS) in a global system for mobile communications (GSM) or in a code division multiple access (CDMA) network, an NB (NodeB) in wideband code division multiple access (WCDMA), or an eNB or an eNodeB (evolutional NodeB) in long term evolution (LTE). The network device 100 may alternatively be a radio controller in a cloud radio access network (CRAN) scenario. The following uses a base station as an example for description in this application.

The terminal 200 may be user equipment (UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device with a wireless communications function, a computing device or another processing device connected to a wireless modem, a vehicle-mounted device, a wearable device, a terminal in a 5G network, a terminal in a future evolved public land mobile network (PLMN), or the like.

In the communications system shown in FIG. 1, a plurality of antennas may be deployed on the network device 100 and the terminal 200, and MIMO is used for communication, thereby significantly improving performance of the wireless communications system. In some implementations, the network device 100 is a transmit end device, and the terminal 200 is a receive end device. In another possible implementation, the terminal 200 is a transmit end device, and the network device wo is a receive end device.

To fully utilize an unlicensed spectrum, the base station may send downlink data to the UE by using the unlicensed spectrum, and the UE may send uplink data to the base station by using the unlicensed spectrum. Before sending data, a transmit end needs to perform listen before talk (LBT). To be specific, the transmit end can send data only when detecting that a channel is idle. To improve data sending efficiency and reduce a quantity of times of performing LBT, an LTE system supports AUL, and the terminal may directly send uplink data on an AUL resource without scheduling the uplink data by the base station.

The following first describes terms in the embodiments of this application. Details are as follows.

(1) HARQ Process

Usually, the terminal may perform uplink transmission by using a resource indicated by an uplink grant (UL grant). The uplink grant may be dynamically scheduled by the base station, or may be preconfigured. Specifically, the terminal may perform, on the resource indicated by the uplink grant, uplink transmission by using a HARQ process (process). For example, the uplink grant of the HARQ process is delivered to a HARQ entity, so that data can be sent on the resource indicated by the uplink grant of the HARQ process.

It should be noted that one HARQ entity may maintain a plurality of parallel HARQ processes, each HARQ process has one HARQ ID, and different HARQ processes may be distinguished by HARQ IDs.

In addition, some HARQ processes need to maintain a state variable, HARQ feedback (HARQ_FEEDBACK), and the terminal may set a HARQ feedback value of a HARQ process to an acknowledgement (acknowledgement, ACK) or a negative acknowledgement (NACK) based on the HARQ feedback value received in the HARQ process.

(2) NDI

Each HARQ process maintains one NDI. In a possible implementation, the NDI is 1 bit, and a value of the bit is used to indicate whether the terminal performs new transmission or retransmission by using the HARQ process. If the value of the NDI for the HARQ process is toggled compared with a value of the NDI in previous transmission, it indicates that the terminal may perform new data transmission by using the HARQ process, if the value of the NDI is not toggled, it indicates that the terminal may perform data retransmission by using the HARQ process.

For example, if the NDI for the HARQ process is toggled from "0" to "1", it indicates that the terminal may perform new transmission by using the HARQ process.

(3) AUL

AUL is uplink transmission performed by using an unlicensed spectrum resource, and the terminal may also perform uplink transmission on an AUL resource without scheduling the uplink data by the base station. Usually, the base station may deliver an AUL configuration to the terminal by using radio resource control (RRC) signaling, where the AUL configuration is a serving cell-level configuration. Specifically, the base station configures, for the terminal by using the RRC signaling, a HARQ process used for AUL in a serving cell, a subframe used for AUL, and the like. In the embodiments of this application, the RRC signaling may be considered as an autonomous uplink transmission configuration message. The subframe used for AUL may be considered as a subframe in which the AUL resource is configured. The HARQ process used for AUL may be considered as a preconfigured HARQ process that can be used for autonomous uplink transmission. In addition, the base station may further send an autonomous uplink transmission activation message to the terminal. When receiving the autonomous uplink transmission activation message, the terminal randomly selects a HARQ process from the foregoing HARQ processes used for AUL, and considers that an NDI for the HARQ process is toggled. The HARQ process selected by the terminal when the terminal receives the autonomous uplink transmission activation message may be referred to as an initially selected HARQ process.

Currently, the terminal is supported to perform new transmission on the AUL resource, and the terminal is also supported to perform retransmission on the AUL resource. For a HARQ process, the terminal may determine whether an NDI for the HARQ process is toggled, to determine whether to perform, in the subframe in which the AUL resource is configured in the serving cell, new transmission or retransmission by using the HARQ process. Specifically, if the AUL resource is configured in a subframe, and a HARQ process selected by the terminal for the subframe is the foregoing initially selected HARQ process, because an NDI for the initially selected HARQ process is toggled, the terminal may enter new transmission in the subframe, and transmit new data to the base station by using the AUL resource. If the terminal selects, for the subframe, other HARQ processes than the foregoing initially selected HARQ process from HARQ processes that are preconfigured by the base station and that can be used for AUL, according to an existing protocol, NDIs of these HARQ processes may not be considered to be toggled, and the terminal cannot enter the new transmission procedure in the current subframe.

In the uplink transmission method provided in the embodiments of this application, the terminal uses a first HARQ process to send data in the subframe in which the AUL resource is configured in the serving cell. If the first HARQ process is a preconfigured HARQ process that can be used for autonomous uplink transmission, and before the subframe, there is no uplink grant for the first HARQ process delivered to the HARQ entity, that is, the first HARQ process is not used for transmission before the subframe, and transmission performed in the subframe is initial transmission for the first HARQ process, the terminal considers that an NDI for the first HARQ process is toggled. Further, the terminal may enter new transmission in the subframe, and perform uplink data transmission by using the first HARQ process. The method provided in the embodiments of this application solves a problem that some preconfigured HARQ processes that can be used for autonomous uplink transmission cannot enter a new transmission procedure during initial transmission and uplink transmission cannot be performed by using the AUL resource. This method avoids a resource waste caused by the problem.

In the embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence.

Figure 2:
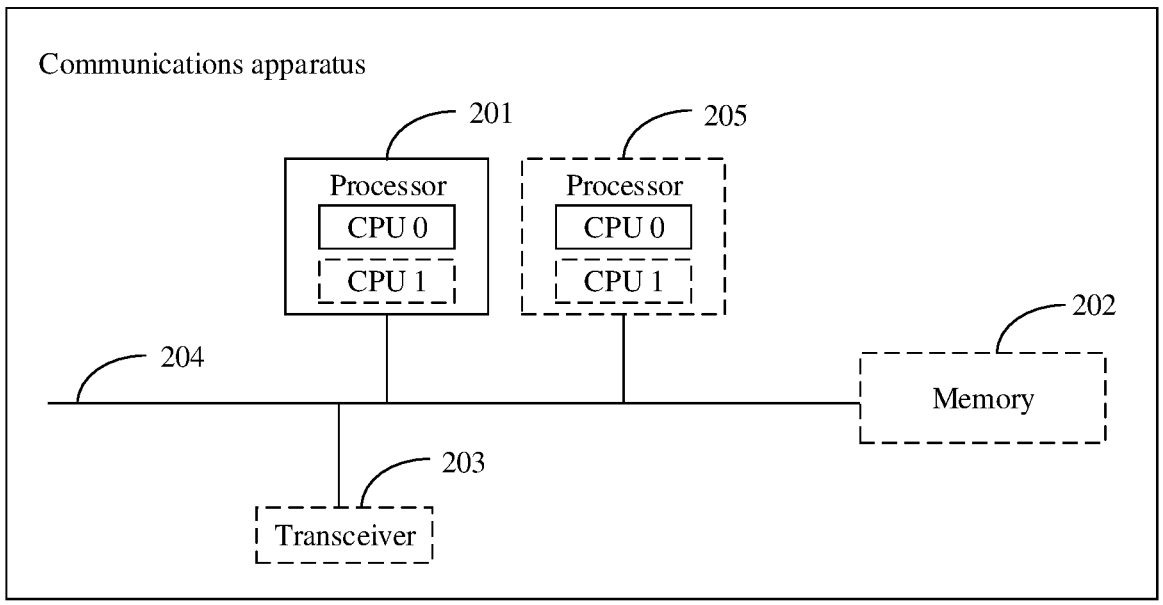
FIG. 2 is a structural block diagram of a communications apparatus according to an embodiment of this application.

The data channel sending method provided in this embodiment of this application may be applied to a communications apparatus shown in FIG. 2, and the communications apparatus may be the terminal 200 in the communications system shown in FIG. 1. As shown in FIG. 2, the communications apparatus may include at least one processor 201, and optionally, may further include a memory 202, a transceiver 203, and a communications bus 204.

The following specifically describes each component of the communications apparatus with reference to FIG. 2.

The processor 201 is a control center of the communications apparatus, and may be one processor or may be a collective term of a plurality of processing elements. For example, the processor 201 may be a central processing unit (CPU), or an application-specific integrated circuit (ASIC), or one or more integrated circuits configured to implement this embodiment of this application, for example, one or more microprocessors (DSP) or one or more field programmable gate arrays (FPGA).

The processor 201 may run or execute a software program stored in the memory 202 and invoke data stored in the memory 202, to execute various functions of the communications apparatus.

During specific implementation, in some embodiments, the processor 201 may include one or more CPUs, for example, a CPU 0 and a CPU 1 shown in FIG. 2.

During specific implementation, in some embodiments, the communications apparatus may include a plurality of processors, for example, the processor 201 and a processor 205 shown in FIG. 2. Each of the processors may be a single-core processor (single-CPU) or may be a multi-core processor (multi-CPU). The processor herein may be one or more communications apparatus, circuits, and/or processing cores for processing data (for example, computer program instructions).

The memory 202 may be a read-only memory (read-only memory, ROM) or another type of static storage communications apparatus that can store static information and instructions, or a random access memory (RAM) or another type of dynamic storage communications apparatus that can store information and instructions, or may be an electrically erasable programmable read-only memory (EEPROM), a compact disc read-only memory (CD-ROM) or another optical disc storage, an optical disc storage (including a compact optical disc, a laser disc, an optical disc, a digital versatile optical disc, a Blu-ray disc, and the like), a magnetic disk storage medium or another magnetic storage communications apparatus, or any other medium that can be used to carry or store expected program code in an instruction or data structure form and that can be accessed by a computer. However, this is not limited herein. The memory 202 may exist independently, or may be connected to the processor 201 by using the communications bus 204. The memory 202 may alternatively be integrated with the processor 201.

The memory 202 is configured to store a software program for performing solutions of this application, and the processor 201 controls execution of the software program.

The transceiver 203 is configured to communicate with a second device. Certainly, the transceiver 203 may be further configured to communicate with a communications network, such as the Ethernet, a radio access network (RAN), or a wireless local area network (WLAN). The transceiver 203 may include a receiving unit for implementing a receiving function and a sending unit for implementing a sending function.

The communications bus 204 may be an industry standard architecture (industry standard architecture, ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

A structure of the communications apparatus shown in FIG. 2 does not constitute a limitation on the communications apparatus. The communications apparatus may include more or fewer components than those shown in the figure, or combine some components, or have different component arrangements.

Figures 3, 4:
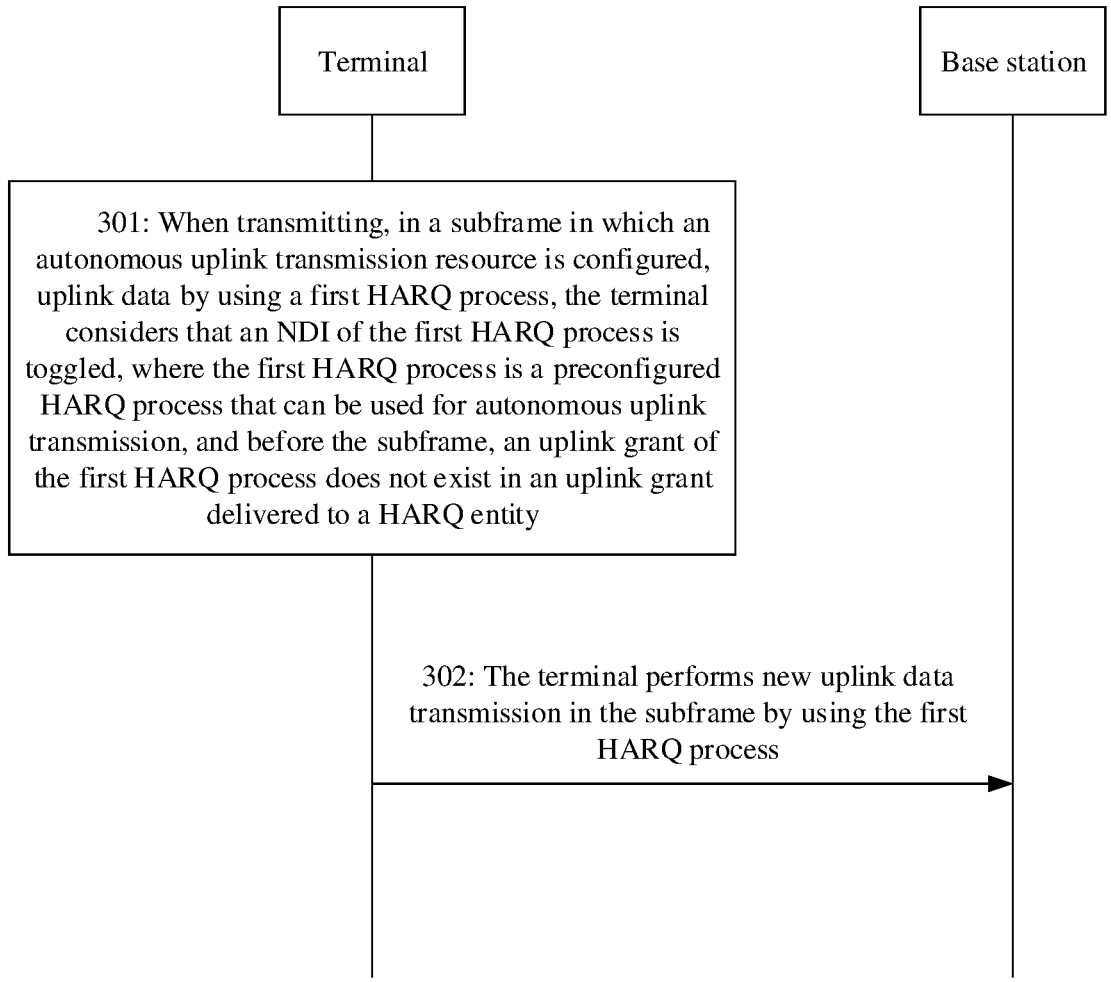
FIG. 3 is a schematic flowchart of an uplink transmission method according to an embodiment of this application.
FIG. 4 is a schematic diagram of an autonomous uplink transmission configuration according to an embodiment of this application.

An embodiment of this application provides an uplink transmission method, which may be applied to the communications system shown in FIG. 1. As shown in FIG. 3, the method includes the following steps.

301: When transmitting, in a subframe in which an autonomous uplink transmission resource is configured, uplink data by using a first HARQ process, a terminal considers that an NDI for the first HARQ process is toggled. The first HARQ process is a preconfigured HARQ process that can be used for autonomous uplink transmission, and before the subframe, there is no uplink grant for the first HARQ process delivered to a HARQ entity.

It should be noted that the subframe in which the autonomous uplink transmission resource is configured may be a subframe in which the autonomous uplink transmission resource is configured in a serving cell of the terminal, and the autonomous uplink transmission resource may be the AUL in this embodiment of this application. The terminal receives an autonomous uplink transmission configuration message from a base station, and may determine, based on the autonomous uplink transmission configuration message, the subframe in which the AUL resource is configured in the serving cell and the HARQ process that can be used for autonomous uplink transmission. The autonomous uplink transmission configuration message may be RRC signaling.

In addition, in this embodiment of this application, the AUL resource may alternatively be another preconfigured grant resource that can be used for uplink transmission. In other words, the terminal can send uplink data on the preconfigured grant resource that can be used for uplink transmission without dynamic scheduling the uplink data by the base station. For example, the AUL resource includes but is not limited to a configured grant type 1 and a configured grant type 2 in a 5G (5th generation) system, and an uplink resource configured in an NR-U (new radio-unlicensed) system. The subframe in which the AUL resource is configured in the serving cell may be considered as a subframe that can be used for autonomous uplink transmission. In addition, a time domain configuration granularity of a grant-free resource (for example, an AUL resource) that can be used for uplink transmission is not limited to a subframe, and may also be a time length or a time domain resource unit of another length, for example, physical uplink shared channel (PUSCH) duration, a symbol, a slot, a mini-slot, a transmission time interval (TTI), or a short transmission time interval (sTTI).

It should be noted that a network device may configure the preconfigured grant resource (which may also be referred to as a preconfigured UL grant) in the following two manners.

First, the network device may preconfigure, in a semi-persistent resource allocation manner, a resource required by the terminal to perform uplink transmission. That is, the resource is a preconfigured UL grant (which may also be referred to as a preconfigured grant resource). It should be understood that the preconfigured UL grant may appear periodically, and the terminal does not need to first obtain the uplink grant each time before performing the uplink transmission. For example, the network device may configure a UL grant for uplink transmission by using the RRC signaling. The RRC signaling may further include a periodicity of the preconfigured UL grant, so that the terminal can perform transmission on the preconfigured UL grant.

The first configuration manner may be referred to as a configured grant type 1 (configured grant type 1).

Second, the network device may configure some information for uplink transmission by using the RRC signaling. For example, the information is a periodicity of a preconfigured UL grant. In addition, the network device carries the preconfigured UL grant by using physical layer signaling, and the physical layer signaling is further used to activate the preconfigured UL grant, so that the terminal can perform transmission on the preconfigured UL grant.

The second configuration manner may be referred to as a configured grant type 2 (configured grant type 2).

It should be noted that naming of the first configuration manner is not limited to the configured grant type 1, and the first configuration manner may also have another name. This is not limited in this embodiment of this application. Similarly, naming of the second configuration manner is not limited to the configured grant type 2, and the second configuration manner may have another name. A communications system to which the first configuration manner and the second configuration manner are applicable is not limited in this embodiment of this application. The communications system may be an LTE communications system, a 5G communications system, or another communications system.

In addition, in this embodiment of this application, the "uplink grant" may be understood as signaling used to schedule a physical uplink resource, for example, downlink control information used for the uplink grant, or RRC signaling used for a semi-persistent configuration, or downlink control information used to activate an uplink grant resource in a semi-persistent configuration manner. In the LTE or new radio (NR) protocol, the "uplink grant" may correspondingly be a UL grant, and a person skilled in the art may understand meanings of the "uplink grant".

During specific implementation, the terminal may determine, based on an aul-HARQ-Processes parameter in the autonomous uplink transmission configuration message (for example, the RRC signaling) delivered by the base station, a HARQ process that can be used for autonomous uplink transmission in the serving cell, and determine, based on an aul-Subframes parameter in the autonomous uplink transmission configuration message, a subframe in which the AUL resource is configured in the serving cell. For example, a HARQ ID indicated by the aul-HARQ-Processes parameter is 0, 1, 3, 4, 6, or 7. In other words, six HARQ processes whose HARQ IDs are 0, 1, 3, 4, 6, and 7 may be used for autonomous uplink transmission.

The aul-Subframes parameter is used to indicate a condition that the subframe in which the AUL resource is configured in the serving cell meets. Specifically, the aul-Subframes parameter may be a sequence with a length of 40 bits, and subframes in which AUL resources are configured may be determined based on the aul-Subframes parameter. Each bit of the sequence corresponds to one subframe. A bit value 1 indicates that an AUL resource is configured in the subframe, and a bit value 0 indicates that no AUL resource is configured in the subframe. A leftmost bit of the aul-Subframes parameter indicates whether an AUL resource is configured in a subframe 0 of a radio frame meeting "SFN mod 4=0", where "SFN mod 4=0", that is, the remainder of a frame number of the radio frame divided by 4 is 0. For example, the frame number may be 0, 4, 8, or 12. By analogy, the aul-Subframes parameter may indicate a status of configuring AUL resources in 40 consecutive subframes. A radio frame whose SFN is 0 is used as an example. A leftmost bit of the aul-Subframes parameter indicates whether an AUL resource is configured in the subframe 0 of the radio frame 0. The aul-Subframes parameter may indicate whether AUL resources are configured in 40 consecutive subframes starting from the subframe 0 of the radio frame 0, that is, indicate a configuration status of 40 subframes included in the radio frame 0 to a radio frame 3. For example, referring to FIG. 4, first ten bits of the aul-Subframes parameter are 1001111100, that is, AUL resources are configured in subframes 0, 3, 4, 5, 6, and 7 of the radio frame 0.

For another example, a leftmost bit of the aul-Subframes parameter may alternatively indicate whether an AUL resource is configured in a subframe 0 of a radio frame 4. Further, the aul-Subframes parameter may indicate whether AUL resources are configured in 40 consecutive subframes starting from the subframe 0 of the radio frame 4, that is, indicate a configuration status of 40 subframes included in the radio frame 4 to a radio frame 7.

It should be noted that the autonomous uplink transmission configuration message does not carry information about a time-frequency resource of an uplink resource used for autonomous uplink transmission. The information about the time-frequency resource of the uplink resource used for autonomous uplink transmission is sent to the terminal through a physical downlink control channel (physical downlink control channel, PDCCH). Specifically, the PDCCH may be used to carry an autonomous uplink transmission activation message, including the information about the time-frequency resource of the uplink resource used for autonomous uplink transmission. When receiving the autonomous uplink transmission activation message, the terminal stores the information that is about the uplink resource time-frequency resource of the uplink resource used for autonomous uplink transmission and that is in the PDCCH. The time-frequency resource, for example, a UL grant, indicated by the information about the time-frequency resource used for autonomous uplink transmission may be used in the subframe that is indicated by the autonomous uplink transmission configuration message and that can be used for autonomous uplink transmission.

After a serving cell receives the autonomous uplink transmission activation message, the terminal checks, in each subframe, whether an AUL resource is configured in the serving cell in the subframe. If an AUL resource is configured in the subframe, the terminal selects one of the preconfigured HARQ processes that can be used for autonomous uplink transmission, and determines, based on whether an NDI for the selected HARQ process is toggled, whether to enter new transmission. In this embodiment of this application, there is no binding relationship between a subframe in which an AUL resource is configured and a HARQ process, and the terminal may randomly select one HARQ process from HARQ processes that are preconfigured by the base station and that can be used for autonomous uplink transmission. Specifically, the HARQ process selected by the terminal for a subframe (referred to as a first subframe below) in which an AUL resource is configured mainly includes the following three types.

First type: an initially selected HARQ process.

The AUL is configured and then activated. The terminal determines, based on the autonomous uplink transmission configuration message from the base station, HARQ processes that can be used for autonomous uplink transmission. After receiving the autonomous uplink transmission activation message, the terminal may use these HARQ processes to perform uplink transmission by using the AUL resource.

In addition, when receiving the autonomous uplink transmission activation message, the terminal may randomly toggle an NDI for one HARQ process, and the HARQ process is an initially selected HARQ process. For example, when receiving the autonomous uplink transmission activation message, the terminal toggles an NDI for a second HARQ process. The second HARQ process is a HARQ process that is determined by the terminal based on an autonomous uplink transmission configuration and that can be used for autonomous uplink transmission.

Because an NDI for the initially selected HARQ process is toggled, the terminal can enter, in the first subframe, new transmission by using the HARQ process, and send data to the base station by using the AUL resource.

Second type: a used HARQ process.

Used HARQ processes are HARQ processes that are used for transmission before the first subframe, or these HARQ processes that are being used for transmission in the first subframe. The transmission performed by using the HARQ process may be uplink transmission scheduled by a dynamic grant, or uplink transmission performed by using the AUL resource. For such HARQ processes, at a moment corresponding to the first subframe, HARQ feedback values of the HARQ processes may be ACKs or NACKs.

If a HARQ feedback value of a HARQ process selected by the terminal for the first subframe is an ACK, it is considered that an NDI for the HARQ process is toggled. Therefore, the terminal can enter new transmission in the first subframe, perform new transmission by using the AUL resource, and send new data to the base station.

If a HARQ feedback value of a HARQ process selected for the first subframe is a NACK, the terminal retransmits data to the base station in the subframe by using the HARQ process.

Third type: an unused HARQ process.

The unused HARQ process is a HARQ process that is selected by the terminal for the first subframe and that is not used for transmission before the first subframe. For example, the HARQ process is not used for uplink transmission scheduled by a dynamic grant, and is not used for uplink transmission of the AUL resource. For such a HARQ process, before the first subframe, the HARQ process has no HARQ feedback value because the HARQ process is not used for transmission.

During specific implementation, the terminal may select a HARQ process for the first subframe when the first subframe needs to be used, or may select a HARQ process for the first subframe at another occasion that exists before the first subframe is used. This is not limited in this embodiment of this application.

According to a conventional technology, if a HARQ process selected by the terminal for the first subframe belongs to the third-type HARQ process, because a HARQ feedback value of the HARQ process is not an ACK, the terminal cannot consider that an NDI for the HARQ process is toggled. Consequently, the terminal cannot enter new transmission in the first subframe.

The method provided in this embodiment of this application is mainly used to solve a problem that the terminal cannot enter a new transmission procedure when selecting the third-type HARQ process. In other words, when the terminal sends, in the subframe in which the AUL resource is configured in the serving cell, data by using the third-type HARQ process (the first HARQ process described in this embodiment of this application), the terminal considers that the NDI for the HARQ process is toggled, and the terminal may enter new transmission in the subframe.

It should be noted that when the terminal performs uplink transmission by using a HARQ process, a physical layer of the terminal first delivers an uplink grant (for example, a UL grant dynamically scheduled by the base station or a configured AUL grant) to the HARQ entity. Then, the HARQ entity delivers the uplink grant to a corresponding HARQ process, and indicates the HARQ process to perform new transmission or retransmission. Therefore, the terminal may determine, in the following manner, whether a HARQ process selected for a subframe in which the AUL resource is configured is used (that is, whether the selected HARQ process is the foregoing third-type HARQ process). If the first HARQ process is selected for the subframe in which the AUL resource is configured in the serving cell, and before the subframe, there is no uplink grant for the first HARQ process delivered to the HARQ entity, that is, the HARQ entity does not deliver the uplink grant to the first HARQ process, it may be determined that the first HARQ process is not used for uplink transmission before the subframe, that is, the first HARQ process is an unused HARQ process. That is, transmission performed in the subframe is initial transmission of the first HARQ process.

During specific implementation, the terminal selects one HARQ process for a subframe in which an AUL resource is configured in a serving cell. Once determining that the HARQ process is the foregoing third-type HARQ process, that is, there is no uplink grant for the HARQ process delivered to the HARQ entity before the subframe, the terminal considers that an NDI for the HARQ process is toggled. Therefore, the terminal may perform new transmission in the subframe by using the HARQ process. In addition, that the terminal considers that the NDI for the HARQ process is toggled may mean that the terminal toggles the NDI for the HARQ process. For example, the NDI for the HARQ process is toggled from "0" to "1".

In another possible implementation, the terminal selects one HARQ process for a subframe in which an AUL resource is configured in a serving cell. Once determining that there is no uplink grant for the HARQ process delivered to the HARQ entity before the subframe, a HARQ feedback value of the HARQ process is set to an ACK. Further, according to an existing protocol, because the HARQ feedback value of the HARQ process is the ACK, the terminal considers that the NDI for the HARQ process is toggled, and may perform new transmission in the subframe by using the HARQ process.

Figure 5:
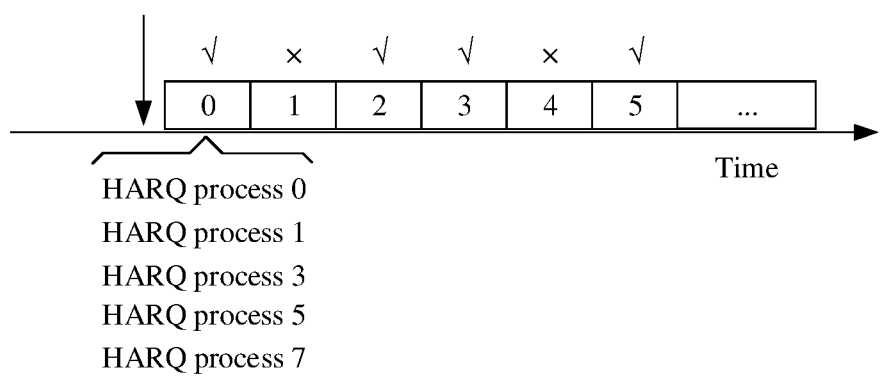
FIG. 5 is a schematic diagram of another autonomous uplink transmission configuration according to an embodiment of this application.

For example, referring to FIG. 5, preconfigured HARQ processes that can be used for autonomous uplink transmission are a HARQ process 0, a HARQ process 1, a HARQ process 3, a HARQ process 5, and a HARQ process 7. The terminal may further determine that subframes in which AUL resources are configured in the serving cell are subframes 0, 2, 3 and 5. When the terminal receives the autonomous uplink transmission activation message, an AUL configuration takes effect. In addition, the terminal toggles an NDI for the HARQ process 0. If the terminal needs to send uplink data, the earliest available subframe is a subframe 0. If the terminal selects the HARQ process 0 to perform uplink transmission, because the NDI for the HARQ process 0 is toggled, the terminal can normally enter new transmission. If the terminal selects another HARQ process, for example, the HARQ process 1, 3, 5, or 7, the terminal can also normally enter a new transmission procedure.

Assuming that the terminal selects the HARQ process 3, the HARQ process 3 is used before the subframe 0, and a HARQ feedback value of the HARQ process 3 is an ACK, the terminal can normally enter new transmission by using the HARQ process 3. Assuming that the terminal selects the HARQ process 4, and the HARQ process 4 is not used before the subframe 0, the terminal considers that an NDI for the HARQ process 4 is toggled, or sets a HARQ feedback value of the HARQ process 4 to an ACK. The terminal can also normally enter new transmission by using the HARQ process 4.

302: The terminal performs new uplink data transmission in the subframe by using the first HARQ process.

In this embodiment of this application, although the first HARQ process is not used for transmission before the subframe described in step 301, the terminal considers that the NDI for the first HARQ process is toggled. Therefore, the terminal may use the first HARQ process to perform new transmission in the subframe by using the AUL resource.

It should be noted that the terminal performs new uplink data transmission in the subframe by using the first HARQ process, that is, data transmitted by the terminal in the subframe by using the first HARQ process is initially transmitted data.

Optionally, when receiving the autonomous uplink transmission activation message, the terminal may not toggle an NDI for a HARQ process. Further, a HARQ process selected by the terminal in a subframe in which an AUL resource is configured includes two types: a used HARQ process and an unused HARQ process, that is, the foregoing second-type HARQ process and the foregoing third-type HARQ process. For used HARQ processes, if HARQ feedback values are ACKs, the terminal may perform new transmission in the subframe by using these HARQ processes. For unused HARQ processes, the terminal cannot perform new transmission in the subframe by using these HARQ processes. In this embodiment of this application, if a HARQ process selected by the terminal in a subframe in which an AUL resource is configured is not used before the subframe, the terminal considers that an NDI for the HARQ process is toggled, or sets a HARQ feedback value of the HARQ process to an ACK, so that the terminal can perform new transmission in the subframe by using the HARQ process, thereby avoiding a resource waste caused by a failure to enter new transmission.

Figure 6:
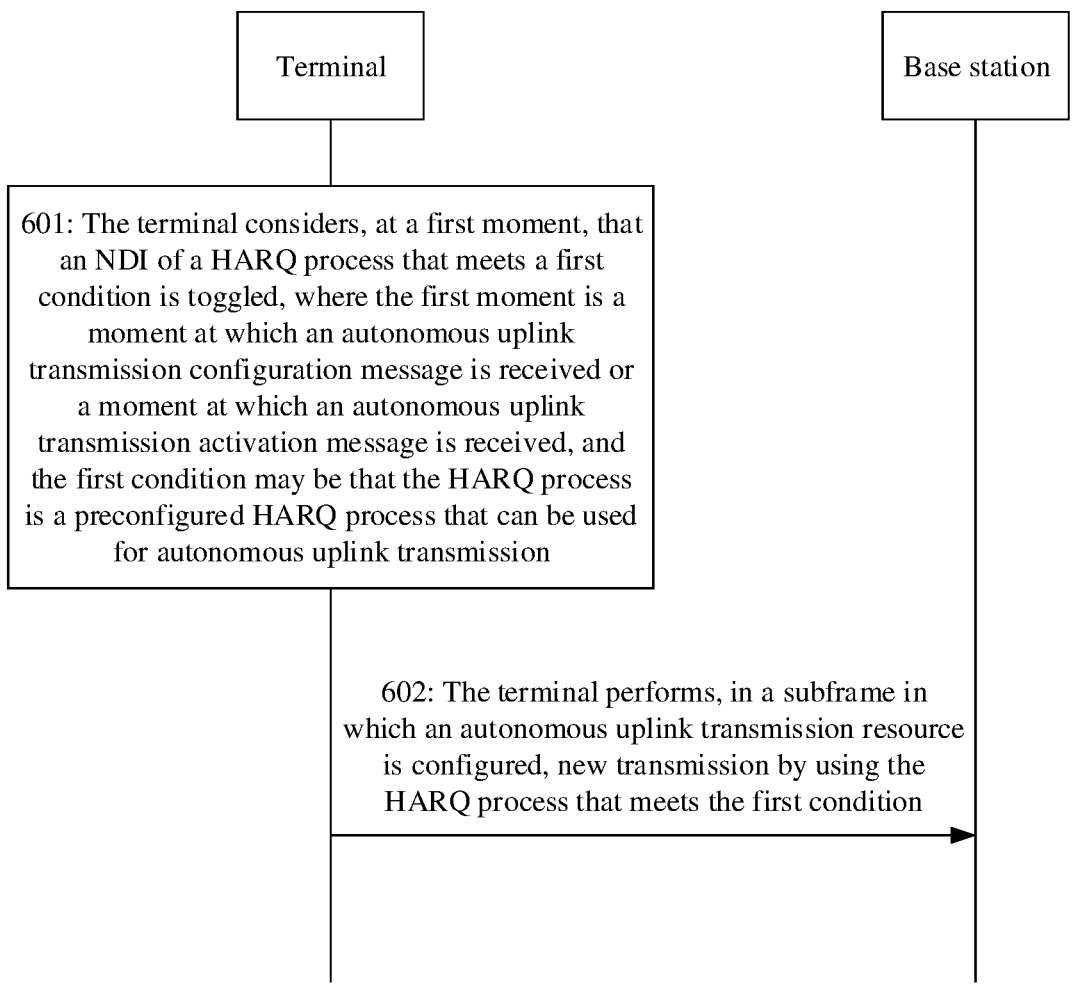
FIG. 6 is another schematic flowchart of an uplink transmission method according to an embodiment of this application.

An embodiment of this application further provides an uplink transmission method, which may be applied to the communications system shown in FIG. 1. As shown in FIG. 6, the method includes the following steps.

601: A terminal considers, at a first moment, that an NDI for a HARQ process that meets a first condition is toggled. The first moment is a moment at which an autonomous uplink transmission configuration message is received or a moment at which an autonomous uplink transmission activation message is received, and the first condition may be that the HARQ process is a preconfigured HARQ process that can be used for autonomous uplink transmission.

It should be noted that the terminal receives the autonomous uplink transmission configuration message sent by a base station, and may determine, based on the autonomous uplink transmission configuration message, a subframe in which an AUL resource is configured in a serving cell and the HARQ process that can be used for autonomous uplink transmission. The autonomous uplink transmission configuration message is used to configure an autonomous uplink transmission resource, and the autonomous uplink transmission activation message is used to activate the autonomous uplink transmission resource.

In a possible implementation, when the terminal receives the autonomous uplink transmission configuration message, provided that a HARQ process is a preconfigured HARQ process that can be used for autonomous uplink transmission, the terminal considers that an NDI for the HARQ process is toggled. Therefore, when the autonomous uplink transmission configuration message is received, it may be considered that NDIs of all preconfigured HARQ processes that can be used for autonomous uplink transmission are toggled.

In another possible implementation, when the terminal receives the autonomous uplink transmission activation message, provided that a HARQ process is a preconfigured HARQ process that can be used for autonomous uplink transmission, the terminal considers that an NDI for the HARQ process is toggled. Therefore, when receiving the autonomous uplink transmission activation message, the terminal may consider that NDIs of all preconfigured HARQ processes that can be used for autonomous uplink transmission are toggled.

During specific implementation, once determining, at the first moment, that a HARQ process meets the first condition, the terminal considers that an NDI for the HARQ process is toggled. Alternatively, the terminal sets, at the first moment, a HARQ feedback value of the HARQ process that meets the first condition to an acknowledgement, and considers, based on the acknowledgement, that the NDI for the HARQ process that meets the first condition is toggled.

602: The terminal performs, in a subframe in which an autonomous uplink transmission resource is configured, new transmission by using the HARQ process that meets the first condition.

It should be noted that the subframe in which the autonomous uplink transmission resource is configured may be a subframe in which the autonomous uplink transmission resource is configured in a serving cell of the terminal, and the autonomous uplink transmission resource may be the AUL in this embodiment of this application.

Optionally, the first condition further includes at the first moment, there is no uplink grant for the HARQ process delivered to a HARQ entity, and before the first moment, there is no uplink grant for the HARQ process delivered to the HARQ entity.

In other words, the terminal considers, at the first moment, that an NDI for a HARQ process that is not used before the first moment is toggled, and that an NDI for a HARQ process that is not being used is toggled. For example, it is assumed that 10 subframes included in one frame are numbered starting from 0, and are respectively a subframe 0, a subframe 1, . . . , and a subframe 9. The terminal receives the autonomous uplink transmission configuration message in the subframe 2 or receives the autonomous uplink transmission activation message in the subframe 2, that is, the first moment is the subframe 2. HARQ processes that are indicated by the autonomous uplink transmission configuration message and that can be used for autonomous uplink transmission are HARQ processes 0, 1, 3, and 5. It is assumed that the HARQ process 1 is used in the subframe 0, and the HARQ process 3 is being used in the subframe 2. The terminal determines that the HARQ processes 0 and 5 are HARQ processes that meet the first condition, and considers that NDIs of the HARQ processes 0 and 5 are toggled.

Optionally, the first condition further includes at the first moment, there is no uplink grant for the HARQ process delivered to a HARQ entity.

In other words, the terminal considers, at the first moment, that an NDI for a HARQ process that is not being used is toggled. For example, the terminal receives the autonomous uplink transmission configuration message in the subframe 2 or receives the autonomous uplink transmission activation message in the subframe 2, that is, the first moment is the subframe 2. HARQ processes that are indicated by the autonomous uplink transmission configuration message and that can be used for autonomous uplink transmission are HARQ processes 0, 1, 3, and 5. It is assumed that the HARQ process 3 is being used in the subframe 2. The terminal determines that the HARQ processes 0, 1, and 5 are HARQ processes that meet the first condition, and considers that NDIs of the HARQ processes 0, 1, and 5 are toggled.

Optionally, the first condition further includes before the first moment, there is no uplink grant for the HARQ process delivered to a HARQ entity.

In other words, the terminal considers, at the first moment, that an NDI for a HARQ process that is not used before the first moment is toggled. For example, the terminal receives the autonomous uplink transmission configuration message in the subframe 2 or receives the autonomous uplink transmission activation message in the subframe 2, that is, the first moment is the subframe 2. HARQ processes that are indicated by the autonomous uplink transmission configuration message and that can be used for autonomous uplink transmission are HARQ processes 0, 1, 3, and 5. It is assumed that before the subframe 2, only the HARQ process 0 is used. Specifically, the HARQ process 0 is used in the subframe 0. In this case, the terminal determines that the HARQ processes 1, 3, and 5 are HARQ processes that meet the first condition, and considers that NDIs of the HARQ processes 1, 3, and 5 are toggled.

Figure 7:
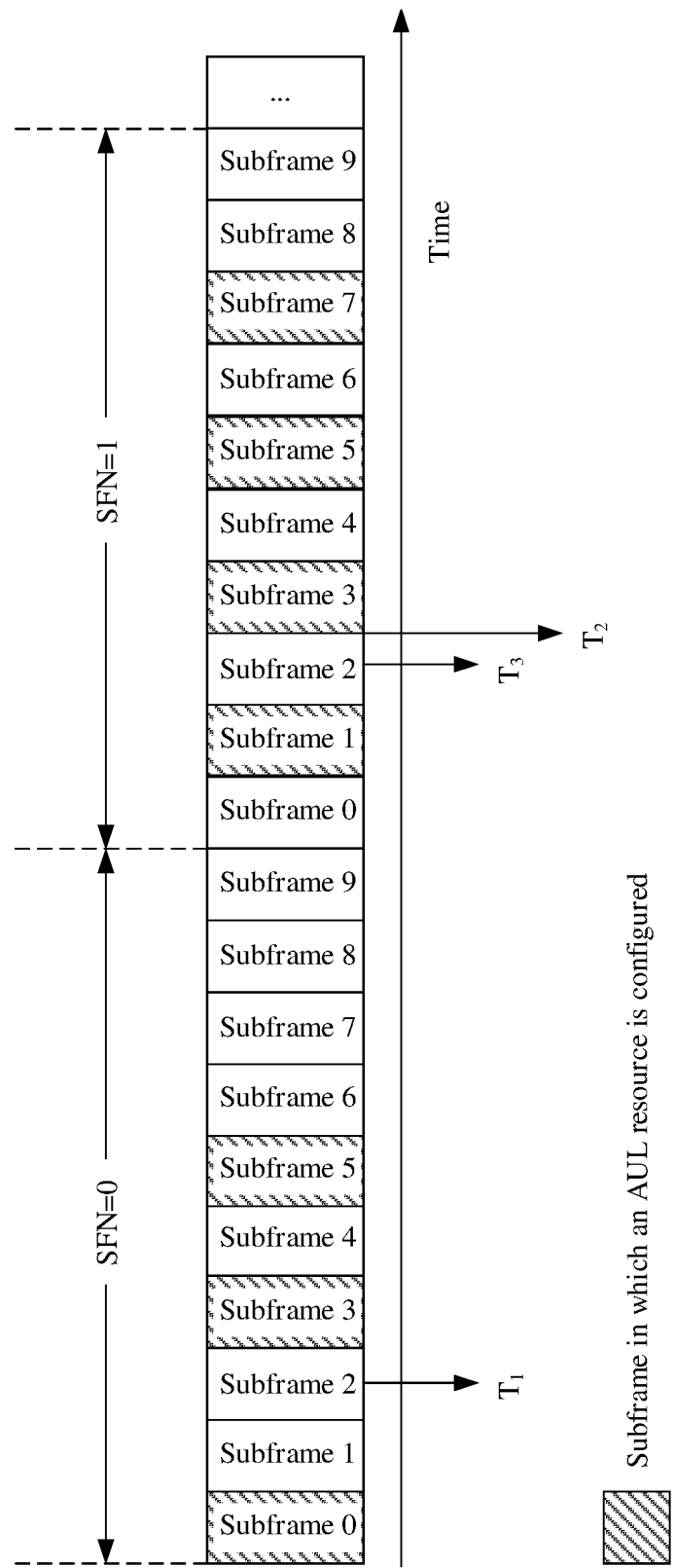
FIG. 7 is a schematic diagram of another autonomous uplink transmission configuration according to an embodiment of this application.

It should be noted that the first moment may alternatively be any moment from a moment $T_1$ at which the terminal receives the autonomous uplink transmission configuration message to a moment $T_2$ at which the terminal starts to use the AUL resource. The moment $T_2$ at which the terminal starts to use the AUL resource is a start moment of the 1st subframe in which the AUL resource is configured after the terminal receives the autonomous uplink transmission activation message. For example, referring to FIG. 7, subframes in which AUL resources are configured in a radio frame 0 are subframes 0, 3, and 5, and subframes in which AUL resources are configured in a radio frame 1 are subframes 1, 3, 5, and 7. The terminal receives the autonomous uplink transmission configuration message in the subframe 2 (denoted as the moment $T_1$) of the radio frame 0, and receives the autonomous uplink transmission activation message in the subframe 2 (denoted as a moment $T_3$) of the radio frame 1. The 1st subframe in which the AUL resource is configured after the subframe 2 of the radio frame 1 is the subframe 3 of the radio frame 1. Therefore, the moment $T_2$ at which the terminal starts to use the AUL resource is a start moment of the subframe 3 of the radio frame 1.

In this embodiment of this application, the first moment may be any moment from $T_1$ to $T_2$. For example, the first moment is $T_1$, or the first moment is $T_3$.

It should be noted that the method shown in FIG. 3 in the embodiments of this application and the method shown in FIG. 6 in the embodiments of this application may be independently applied or used together. This is not limited in this embodiment of this application. In addition, the "consider" described in this embodiment of this application may be that the terminal specifically implements a toggling behavior, and toggles an NDI for a HARQ process. For example, if the NDI for the HARQ process is toggled from 0 to 1, the terminal considers that the NDI for the HARQ process is toggled. Alternatively, the terminal may not perform a toggling behavior, may consider that the current NDI for the HARQ process is toggled, and enter new uplink data transmission.

The following describes in detail the method provided in this embodiment of this application with reference to an example. For example, HARQ processes that are configured by the base station for the terminal by using RRC signaling and that can be used for autonomous uplink transmission in a serving cell are a HARQ process 0, a HARQ process 1, a HARQ process 3, a HARQ process 4, a HARQ process 6, and a HARQ process 7. 0, 1, 3, 4, 6, and 7 are IDs of the HARQ processes.

In addition, it is assumed that a leftmost bit of an aul-Subframes parameter of the RRC signaling indicates whether an AUL resource is configured in the subframe 0 of the radio frame 0. The aul-Subframes parameter may indicate subframes in which AUL resources are configured in the serving cell in radio frames 0, 1, 2, and 3. A frame 0 is used only as an example. It is assumed that subframes 0, 3, 4, 5, 6, and 7 of the frame 0 are subframes in which AUL resources are configured in the serving cell.

In a first possible implementation, when an AUL resource is configured in a subframe, the terminal may send uplink data in the subframe by using the AUL resource. The terminal may select one HARQ process from preconfigured HARQ processes that can be used for autonomous uplink transmission to perform uplink transmission. If the terminal determines that before the subframe, there is no uplink grant for the HARQ process delivered to the HARQ entity, the terminal considers that an NDI for the HARQ process is toggled.

The subframe 0 is used as an example. If the terminal selects the HARQ process 4 in the subframe 0 to perform uplink transmission, when determining that before the subframe 0, there is no uplink grant for the HARQ process 4 delivered to the HARQ entity, the terminal considers that transmission performed in the subframe 0 is initial transmission of the HARQ process 4, and further considers that an NDI for the HARQ process 4 is toggled. Therefore, the terminal may newly transmit data to the base station in the subframe 0 by using the HARQ process 4.

In a second possible implementation, when receiving the autonomous uplink transmission configuration message sent by the base station, or receiving the autonomous uplink transmission activation message, the terminal toggles NDIs of all HARQ processes that are preconfigured by the base station and that can be used for autonomous uplink transmission.

After autonomous uplink transmission is activated, when determining that an AUL resource is configured in a subframe, the terminal may select one HARQ process from preconfigured HARQ processes that can be used for autonomous uplink transmission to perform uplink transmission. Because when receiving the autonomous uplink transmission configuration message or the autonomous uplink transmission activation message, the terminal toggles NDIs of all HARQ processes that can be used for autonomous uplink transmission, the terminal can normally enter new transmission.

For example, when receiving the autonomous uplink transmission configuration message or receiving the autonomous uplink transmission activation message, the terminal toggles NDIs of the HARQ process 0, the HARQ process 1, the HARQ process 3, the HARQ process 4, the HARQ process 6, and the HARQ process 7 that are preconfigured by the base station. In any one of the subframes 0, 3, 4, 5, 6, and 7, the terminal randomly selects one of the HARQ processes preconfigured by the base station, the NDIs of the HARQ processes are toggled, and the terminal can normally enter new transmission.

In a third possible implementation, when receiving the autonomous uplink transmission configuration message or the autonomous uplink transmission activation message sent by the base station, the terminal toggles an NDI for a HARQ process that is not used before and is not being used and that is in all the HARQ processes, preconfigured by the base station, that can be used for autonomous uplink transmission.

The HARQ process that is not used before is a HARQ process that is not used before a moment at which the terminal receives the autonomous uplink transmission configuration message or the autonomous uplink transmission activation message. In other words, there is no uplink grant for the HARQ process delivered to the HARQ entity. For example, the HARQ process that is not used before is a HARQ process that is not scheduled before. A currently being used HARQ process may be a HARQ process that is scheduled and used for implementing the uplink grant when the terminal receives the autonomous uplink transmission configuration message or the autonomous uplink transmission activation message, that is, an uplink grant of the HARQ process exists in the uplink grant delivered to the HARQ entity at this moment.

For example, HARQ processes that are preconfigured by the base station and that can be used for autonomous uplink transmission are HARQ processes 0, 1, 3, 4, 6, and 7. If when the terminal receives the autonomous uplink transmission configuration message or the autonomous uplink transmission activation message, the HARQ process 1 and the HARQ process 3 have been used for implementing a previous uplink grant, and no HARQ process is being used for implementing the uplink grant at this time, the terminal only needs to toggle NDIs of the HARQ processes 0, 4, 6, and 7.

In a fourth possible implementation, when receiving the autonomous uplink transmission configuration message or the autonomous uplink transmission activation message, the terminal toggles an NDI for a HARQ process that is not being used currently and that is in the HARQ processes, preconfigured by the base station, that can be used for autonomous uplink transmission. The currently being used HARQ process may be a HARQ process that is scheduled and used for implementing the uplink grant when the terminal receives the autonomous uplink transmission configuration message or the autonomous uplink transmission activation message, that is, an uplink grant of the HARQ process exists in the uplink grant delivered to the HARQ entity at this moment.

For example, HARQ processes that are preconfigured by the base station and that can be used for autonomous uplink transmission are HARQ processes 0, 1, 3, 4, 6, and 7. If when the terminal receives the autonomous uplink transmission configuration message or the autonomous uplink transmission activation message, the uplink grant is implemented by scheduling and using the HARQ process 0, the terminal only needs to toggle NDIs corresponding to the HARQ processes 1, 3, 4, 6, and 7.

It should be noted that if the HARQ process 1 and the HARQ process 3 have been used for implementing a previous uplink grant before the moment at which the terminal receives the autonomous uplink transmission configuration message or the autonomous uplink transmission activation message, and HARQ feedback values of the HARQ process 1 and the HARQ process 3 are ACKs, even if the NDIs of the HARQ process 1 and the HARQ process 3 are not toggled, when the terminal selects the HARQ process 1 or the HARQ process 3 in the subframe in which the AUL resource is configured, the terminal may also normally enter new transmission.

In a fifth possible implementation, when receiving the autonomous uplink transmission configuration message or the autonomous uplink transmission activation message, the terminal toggles an NDI for a HARQ process that is not used before and that is in the HARQ processes, preconfigured by the base station, that can be used for autonomous uplink transmission.

The HARQ process that is not used before is a HARQ process that is not used before the moment at which the terminal receives the autonomous uplink transmission configuration message or the autonomous uplink transmission activation message. In other words, there is no uplink grant for the HARQ process delivered to the HARQ entity. For example, the HARQ process that is not used before is a HARQ process that is not scheduled before.

For example, HARQ processes that are preconfigured by the base station and that can be used for autonomous uplink transmission are HARQ processes 0, 1, 3, 4, 6, and 7. If when the terminal receives the autonomous uplink transmission configuration message or the autonomous uplink transmission activation message, the HARQ process 1 and the HARQ process 3 have been used for implementing a previous uplink grant, the terminal only needs to toggle NDIs of the HARQ processes 0, 4, 6, and 7.

It should be noted that, in the foregoing first to fifth possible implementations, the terminal may alternatively set the HARQ feedback value of the HARQ process that meets the condition as the acknowledgement, and consider, based on the acknowledgement, that the NDI for the HARQ process that meets the condition is toggled.

Figure 8:
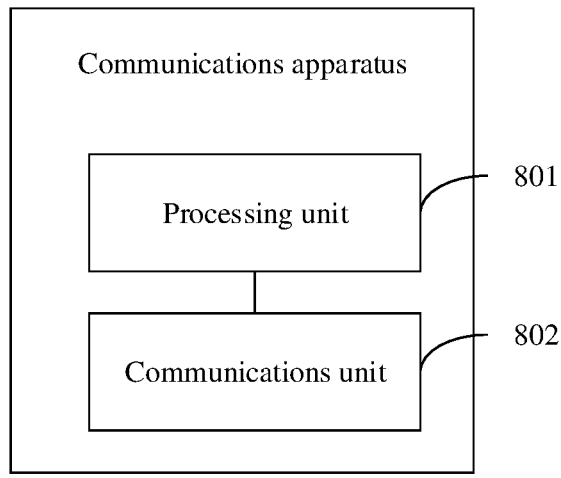
FIG. 8 is another structural block diagram of a communications apparatus according to an embodiment of this application.

When each function module is obtained through division based on each corresponding function, FIG. 8 is a possible schematic structural diagram of the communications apparatus in the foregoing embodiments. The communications apparatus shown in FIG. 8 may be the terminal described in this embodiment of this application, or may be a component that implements the foregoing method in the terminal, or may be a chip applied to the terminal. The chip may be a system-on-a-chip (System-On-a-Chip, SOC), a baseband chip with a communications function, or the like. As shown in FIG. 8, the communications apparatus includes a processing unit 801 and a communications unit 802. The processing unit may be one or more processors, and the communications unit may be a transceiver.

The processing unit 801 is configured to support the communications apparatus in performing step 301 and step 601 in the foregoing embodiments, and/or another process of the technology described in this specification.

The communications unit 802 is configured to support communication between the communications apparatus and another communications apparatus, for example, support the communications apparatus in performing steps 302 and 602 in the foregoing embodiments, and/or another process of the technology described in this specification.

It should be noted that all related content of the steps in the foregoing method embodiments may be cited in function descriptions of corresponding function modules. Details are not described herein again.

Figure 9:
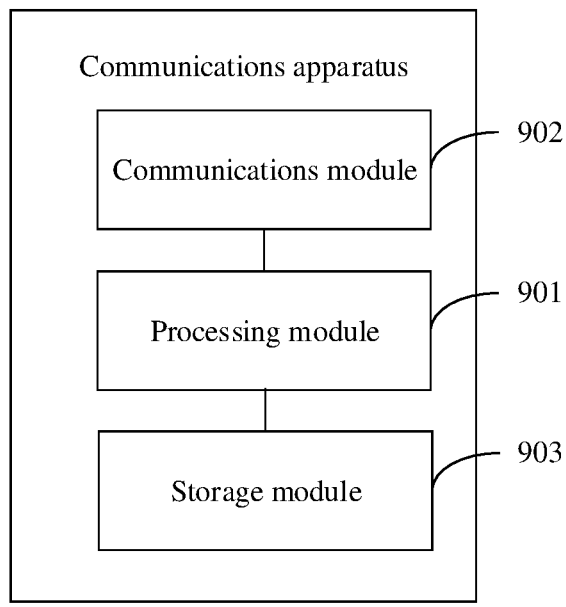
FIG. 9 is another structural block diagram of a communications apparatus according to an embodiment of this application.

For example, when an integrated unit is used, FIG. 9 is a schematic structural diagram of a communications apparatus according to an embodiment of this application. In FIG. 9, the communications apparatus includes a processing module 901 and a communications module 902. The processing module 901 is configured to control and manage actions of the communications apparatus, for example, perform the step performed by the processing unit 801, and/or another process in the technology described in this specification. The communications module 902 is configured to perform the steps performed by the communications unit 802, and support interaction between the communications apparatus and another device, for example, interaction with another terminal. As shown in FIG. 9, the communications apparatus may further include a storage module 903, and the storage module 903 is configured to store program code and data of the communications apparatus.

When the processing module 901 is a processor, the communications module 902 is a transceiver, and the storage module 903 is a memory, the communications apparatus is the communications apparatus shown in FIG. 2.

An embodiment of this application provides a computer-readable storage medium, where the computer-readable storage medium stores instructions, and the instructions are used to perform the uplink transmission methods shown in FIG. 3 and FIG. 6.

An embodiment of this application provides a computer program product including instructions, where when the computer program product runs on a communications apparatus, the communications apparatus is enabled to perform the uplink transmission methods shown in FIG. 3 and FIG. 6.

An embodiment of this application provides a wireless communications apparatus, where the wireless communications apparatus includes instructions, and when the wireless communications apparatus runs on the terminal shown in FIG. 2, FIG. 8, and FIG. 9, the terminal is enabled to perform the uplink transmission method shown in FIG. 3 and FIG. 6. The wireless communications apparatus may be a chip.

An embodiment of this application further provides a communications system, including a base station and the communications apparatus shown in FIG. 2. Alternatively, the system includes a base station and the communications apparatus shown in FIG. 8. Alternatively, the system includes a base station and the communications apparatus shown in FIG. 9.

The foregoing descriptions about implementations allow a person skilled in the art to understand that, for the purpose of convenient and brief description, division of the foregoing function modules is used as an example for illustration. In actual application, the foregoing functions can be allocated to different function modules and implemented according to a requirement, that is, an inner structure of a database access apparatus is divided into different function modules to implement all or some of the functions described above.

In the several embodiments provided in this application, it should be understood that the disclosed database access apparatus and method may be implemented in other manners. For example, the described database access apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the database access apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An uplink transmission method, comprising:
   receiving an autonomous uplink transmission activation message, wherein the autonomous uplink transmission activation message indicates to activate an autonomous uplink transmission resource;
   toggling a new data indicator (NDI) for a second hybrid automatic repeat request (HARQ) process, wherein the second HARQ process is different from a first HARQ process; and
   performing new uplink data transmission after receiving the autonomous uplink transmission activation message, and in a process of transmitting, in a subframe in which an autonomous uplink transmission resource is configured, uplink data using the first HARQ process, wherein the new uplink data transmission is performed in the subframe using the first HARQ process in response to an NDI for the first HARQ process being toggled, wherein the first HARQ process is a HARQ process that can be used for autonomous uplink transmission, and wherein there is no uplink grant delivered, before the subframe, for the first HARQ process, to a HARQ entity.

2. The method according to claim 1, further comprising:
   setting a HARQ feedback value of the first HARQ process to an acknowledgement; and
   wherein the NDI for the first HARQ process is considered to be toggled in response to the acknowledgement.

3. The method of claim 1, wherein the first HARQ process is preconfigured prior to the process of transmitting the uplink data.

4. The method of claim 1, wherein the first HARQ process is determined according to an autonomous uplink transmission configuration message sent, by a base station, in radio resource control (RRC) signaling.

5. The method of claim 4, wherein the subframe is determined according to an aul-Subframes parameter in the autonomous uplink transmission configuration message.

6. The method of claim 4, wherein the first HARQ process is indicated by a HARQ ID of an aul-HARQ-Processes parameter of the autonomous uplink transmission configuration message.

7. A communications apparatus, comprising:
   at least one processor; and
   a non-transitory computer readable memory coupled to the at least one processor and storing a program for execution by the processor, instructions for:
   receiving an autonomous uplink transmission activation message, wherein the autonomous uplink transmission activation message indicates to activate an autonomous uplink transmission resource;
   toggling a new data indicator (NDI) for a second hybrid automatic repeat request (HARQ) process, wherein the second HARQ process is different from a first HARQ process; and
   performing new uplink data transmission after receiving the autonomous uplink transmission activation message, and in a process of transmitting, in a subframe in which an autonomous uplink transmission resource is configured, uplink data by using the first HARQ process, wherein the new uplink data transmission is performed in the subframe using the first HARQ process in response to an NDI for the first HARQ process being toggled, wherein the first HARQ process is a HARQ process that can be used for autonomous uplink transmission, and wherein there is no uplink grant delivered, before the subframe, for the first HARQ process to a HARQ entity.

8. The apparatus according to claim 7, wherein the program includes instructions for:
   setting a HARQ feedback value of the first HARQ process to an acknowledgement; and
   wherein the NDI for the first HARQ process is considered to be toggled in response to the acknowledgement.

9. The communications apparatus of claim 7, wherein the first HARQ process is preconfigured prior to the process of transmitting the uplink data.

10. The communications apparatus of claim 7, wherein the first HARQ process is determined according to an autonomous uplink transmission configuration message sent, by a base station, in radio resource control (RRC) signaling.

11. The communications apparatus of claim 10, wherein the subframe is determined according to an aul-Subframes parameter in the autonomous uplink transmission configuration message.

12. The communications apparatus of claim 10, wherein the first HARQ process is indicated by a HARQ ID of an aul-HARQ-Processes parameter of the autonomous uplink transmission configuration message.

13. A non-transitory computer-readable storage medium, storing a program for execution by a computing device, the program including instructions for:
   receiving an autonomous uplink transmission activation message, wherein the autonomous uplink transmission activation message indicates to activate an autonomous uplink transmission resource;
   toggling a new data indicator (NDI) for a second hybrid automatic repeat request (HARQ) process, wherein the second HARQ process is different from a first HARQ process; and
   performing new uplink data transmission after receiving the autonomous uplink transmission activation message, and in a process of transmitting, in a subframe in which an autonomous uplink transmission resource is configured, uplink data by using the first HARQ process, wherein the new uplink data transmission is performed in the subframe using the first HARQ process in response to an NDI for the first HARQ process being toggled, wherein the NDI is considered to be toggled in response to the transmission on the subframe being an initial transmission for the first HARQ process, wherein the first HARQ process is a HARQ process that can be used for autonomous uplink transmission, and wherein there is no uplink grant delivered, before the subframe, for the first HARQ process delivered to a HARQ entity.

14. The non-transitory computer-readable storage medium according to claim 13, the program includes instructions for:

setting a HARQ feedback value of the first HARQ process to an acknowledgement, and wherein the NDI for the first HARQ process is considered to be toggled in response to the acknowledgement.

15. The non-transitory computer-readable storage medium of claim 13, wherein the first HARQ process is preconfigured prior to the process of transmitting the uplink data.

16. The non-transitory computer-readable storage medium of claim 13, wherein the first HARQ process is determined according to an autonomous uplink transmission configuration message sent, by a base station, in radio resource control (RRC) signaling.

17. The non-transitory computer-readable storage medium of claim 16, wherein the subframe is determined according to an aul-Subframes parameter in the autonomous uplink transmission configuration message.

\* \* \* \* \*